United States Patent Office 3,531,550
Patented Sept. 29, 1970

3,531,550
PHOSPHORUS ESTER AMIDES
John F. Herber, St. Louis, Mo., and Quentin E. Thompson, Belleville, Ill., assignors to Monsanto Company, St. Louis, Mo., a corporation of Delaware
No Drawing. Continuation-in-part of application Ser. No. 479,319, Aug. 12, 1965. This application Feb. 3, 1966, Ser. No. 524,871
Int. Cl. C07f 9/22, 9/24; C09k 3/02
U.S. Cl. 260—959
8 Claims

ABSTRACT OF THE DISCLOSURE

This invention relates to amides of an acid of phosphorus and to the use of such compounds as functional fluids. There is also a method of producing phosphorotriamidates.

---

This application is a continuation-in-part of application Ser. No. 479,319, filed Aug. 12, 1965 now abandoned.

Many different types of materials are utilized as functional fluids and functional fluids are used in many different types of applications. Such fluids have been used as electronic coolants, atomic reactor coolants, diffusion pump fluids, synthetic lubricants, damping fluids, bases for greases, force transmission fluids (hydraulic fluids), heat transfer fluids, die casting release agents in metal extrusion processes and as filter mediums for air conditioning systems. Because of the wide variety of applications and the varied conditions under which functional fluids are utilized, the properties desired in a good functional fluid necessarily vary with the particular application in which it is to be utilized with each indivdual application requiring a functional fluid having a specific class of propertes.

Of the foregoing the use of functional fluids as heat transfer fluids and hydraulic fluids, particularly aircraft hydraulic fluids, has posed what is probably the most difficult areas of application. Thus, the requirements of a heat transfer fluid are as follows: The fluid should be liquid over a wide temperature range, and in general have a low vapor pressure so as to be utilized at atmospheric pressure. Such fluid should be operable as a heat transfer media over an extended period of time at given temperatures and should in addition be non-flammable, non-toxic and exhibit a high degree of thermal and hydrolytic stability.

The requirements for an aircraft hydraulic fluid can be described as follows: The hydraulic power systems of aircraft for operating various mechanisms of an airplane impose stringent requirements on the hydraulic fluid used. Not only must the hydraulic fluid for aircraft meet stringent functional and use requirements but in addition such fluid should be as highly non-flammable as possible and must be sufficiently non-flammable to satisfy aircraft requirements for fire resistance. The viscosity characteristics of the fluid must be such that it may be used over a wide temperature range; that is, adequately high viscosity at high temperature, low viscosity at low temperature and a low rate of change of viscosity with temperature. Such temperature range is generally from —40° F. to 350° F. Its pour point should be low. Its volatility should be low at elevated temperatures of use and the volatility should be balanced; that is, selective evaporation or volatilization of any important component should not take place at the high temperatures of use. It must possess sufficient lubricity and mechanical stability to enable it to be used in the self-lubricated pumps, valves, etc. employed in the hydraulic systems of aircraft which are exceedingly severe on the fluid used. It should be thermally and chemically stable in order to resist oxidation and decomposition so that it will remain uniform under conditions of use and be able to resist the loss of desired characteristics due to high and sudden changes of pressure and temperature, high shearing stresses, and contact with various metals which may be, for example, aluminum, bronze, copper and steel. It should also not deteriorate the gaskets or packings of the hydraulic system. It must not adversely affect the materials of which the system is constructed, and in the event of a leak, should not adversely affect the various parts of the airplane with which it may accidentally come in contact, such as electrical wire insulation and paint. It should not be toxic or harmful to personnel who may come in contact with it.

It is, therefore, an object of this invention to provide compounds which have fire-resistant properties and a wide liquid range. It is a further object of this invention to provide fluids which have utility as functional fluids, particularly aircraft hydraulic fluids and heat transfer fluids.

Other objects will be apparent from the following description of the invention.

It has now been found that fire-resistant functional fluids which have excellent physical properties, and which are particularly suitable for use as aircraft fire-resistant hydraulic fluids and heat transfer fluids, are obtained through the use of amides of an acid of phosphorus which are represented by the structures (a) a monoamide of an acid of phosphorus represented by the structure

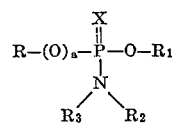

(b) a diamide of an acid of phosphorus represented by the structure

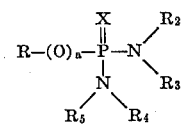

(c) a triamide of an acid of phosphorus represented by the structure

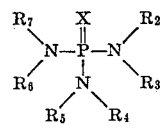

and (d) mixtures of (a), (b) and (c)

wherein R can be alkyl, aryl or substituted aryl having from one to four substituents each of which is selected from the group consisting of halogen, alkyl, haloalkyl, phenoxy, substituted phenoxy, thiophenoxy, substituted thiophenoxy, phenyl, substituted phenyl and N,N'-dialkylamino; $R_1$ can be alkyl, aryl or substituted aryl having from one to four substituents each of which is selected from the group consisting of halogen, alkyl, phenoxy, substituted phenoxy, thiophenoxy, substituted thiophenoxy, phenyl, substituted phenyl and N,N'-dialkylamino; $R_2$ and $R_3$ can be hydrogen, alkyl or together can form a heterocyclic ring optionally interrupted by hetero atoms selected from the group consisting of oxygen, sulfur and nitrogen; $R_4$ and $R_5$ can be hydrogen, alkyl or together can form a heterocyclic ring optionally interrupted by hetero atoms selected from the group consisting of oxygen, sulfur and nitrogen; $R_6$ and $R_7$ each can be hydrogen, alkyl or together can form a heterocyclic ring optionally interrupted by hetero atoms selected from the group consisting of oxygen, sulfur and nitrogen, provided that the number of hydrogen atoms attached to the sum of the nitrogen atoms which are bonded to the phosphorus atom does not exceed 10% of the total number of substituents attached to the sum of the nitrogen atoms; X can be sulfur or oxygen, $a$ is a whole number having a value of 0 to 1. It is preferred that the alkyl groups attached to the same nitrogen atom be different either with respect to the number of carbon atoms or with respect to branching on the alkyl radical, thereby including as different radicals isomers containing the same number of carbon atoms. In general, when the alkyl groups attached to the same nitrogen atom are different, the compounds of this invention have lower pour points and remain liquid at lower temperatures than the compounds wherein the alkyl groups attached to the same nitrogen atom are identical.

The new monoamides of an acid of phosphorus can be prepared by reacting (a) a hydroxy compound represented by the structure $$R_1OH$$

and (b) a compound selected from the group consisting of (1) 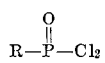

herein defined as a phosphonyldichloride, (2) 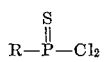

herein defined as a thionophosphonyldichloride, (3)     phosphorusoxychloride (4)     thiophosphorylchloride When (b) is (3) or (4), (a) and (b) are in turn interacted with (c) a hydroxy compound represented by the structure $$ROH$$

The reaction product of (a) and (b) (1) or (2) and (a) and (b) (3) or (4) and (c), hereinafter referred to as the chloro intermediate, which can be represented by the structure

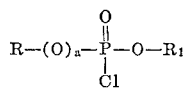

is in turn reacted with (d) an amine represented by the structure

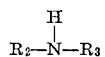

wherein R, $R_1$, $R_2$, $R_3$ and $a$ have their aforedescribed significance.

In the preparation of the chloro intermediate, the mole ratio of (a):(b)(1) or (2) is generally 1:1, respectively and the mole ratio of (a):(b)(3) or (4):(c) is generally 1:1:1, respectively, and are prepared by heating (a) and (b)(1) or (2) or (a), (b)(3) or (4) and (c) at a temperature of from about 0° C. to about 150° C., preferably from about 40° C. to about 80° C. for about one to about 8 hours, preferably for about 2 to about 4 hours. The reaction can be carried out by mixing reactants (a) and (b)(1) or (2) or (a), (b)(3) or (4) and (c) simultaneously or by adding any one reactant to a mixture of the remaining reactants, there being no critical order of addition of reactants.

The preferred method of addition is by adding (a) to (b)(1) or (2) and by adding a mixture of (a) and (c) to (b)(3) or (4) thereby effecting a constant temperature during addition. When (a) and (c) are different in the interaction of (a), (b)(3) or (4) and (c), a two-step order of addition can be utilized. Thus, (a) can be added to (b)(3) or (4) followed by the further addition of (c) to (a) and (b)(3) or (4). The latter method of addition obviates the necessity of fractional distillation of the reaction mixture to yield compounds of this invention wherein R and $R_1$ are different. This invention also contemplates that statistical mixtures containing the compounds of this invention can be prepared when (a) and (c) are different. Thus, when (a), (b)(3) or (4) and (c) are mixed simultaneously or a mixture of (a) and (c) is added to (b)(3) or (4) or (b)(3) or (4) is added to a mixture of (a) and (c), statistical mixtures can be obtained that are represented by the general structures

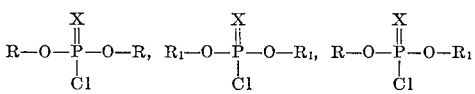

wherein R, $R_1$ and X have their aforedescribed significance. These compounds can be selectively distilled to produce pure compounds of this invention. However, the mixtures themselves can be utilized to prepare mixtures of compounds which are also useful for the purposes disclosed herein.

A catalyst can be utilized to facilitate the reaction, but the reaction can be carried out in situ without a catalyst. Typical catalysts which can be employed are anhydrous aluminum chloride, aluminum bromide, boron trifluoride and zinc chloride. When a catalyst is employed, it is usually present in an amount of from 0.50% to 5% per mole of the sum of reactant (a) or reactants (a) and (c) utilized in the preparation of the chloro intermediate. The reaction can be conducted in the absence of a solvent, or a chlorinated solvent or inert aliphatic solvent can be used as a reaction medium.

The chloro intermediate is generally distilled prior to the reaction with the amine in order to produce the pure compounds of this invention. The mole ratio of chloro intermediate to reactant (d) is generally about 1:1 to about 1:2, preferably 1:1 to 1:1.5, respectively. The reaction is carried out by adding the chloro intermediate to reactant (d); however, the inverse order of addition can also be employed. Due to the exothermic nature of the reaction, it is preferred to add the chloro intermediate gradually to reactant (d) in order to maintain constant temperature. To facilitate the ease of reaction, an acid acceptor can be employed, such as triethylamine and pyridine, or a basic medium can be employed to neutralize the by-product hydrogen chloride. Suitable basic mediums are aqueous sodium hydroxide or aqueous potassium hydroxide. An aqueous solution containing from about 10% to 40% by weight base is generally employed to neutralize the hydrogen chloride evolved. Generally there should be present at least one mole of base mole of hydrogen chloride liberated during the reaction to insure complete neutralization. However, reaction conditions can be employed whereby no acid acceptor is utilized, wherein the volatile hydrogen chloride is removed directly from the reaction system. Thus, a partial vacuum can be applied directly to the reaction medium to facilitate the removal of the volatile hydrogen chloride.

The preferred method of reaction of the chloro intermediate with reactant (d) is by utilizing a basic medium consisting of aqueous sodium hydroxide wherein the aqueous sodium hydroxide is added directly to the secondary amine (d). By utilizing the previously-described preferred order of addition of reactants, a uniform temperature of reaction is obtained in the basic medium.

The temperature of reaction is generally maintained from about 0° C. to about 80° C., preferably from about 20° C. to 40° C. The time for the reaction is generally from about 1 hour to 8 hours, preferably from about 2 hours to 4 hours.

The preferred compounds of this invention are those compounds in which X is oxygen and (a) has a value of 1 and at least one of the substituents R and $R_1$ is aryl or substituted aryl. These compounds and mixtures of compounds are herein defined as phosphoroamidates. The unusual and unexpected properties of the phosphoroamidates are their wide liquid range, viscosity characteristics at given temperatures, and their hydrolytic and thermal stability.

The new diamines of an acid of phosphorus of this invention can be prepared by reacting
(a) a compound represented by the structure

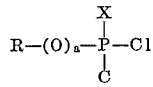

hereinafter referred to as a dichloro intermediate,
(b) an amine represented by the structure

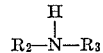

and (c) an amine represented by the structure

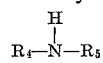

wherein R, $R_2$, $R_3$, $R_4$, $R_5$, X and $a$ have their aforedescribed significance.

The dichloro intermediate wherein $a$ has a value of 1 can be prepared by heating phosphorusoxychloride or thiophosphorylchloride with ROH wherein R has its aforedescribed significance at a temperature of from about 30° C. to about 150° C., preferably from about 80° C. to 115° C. from about 1 hour to about 7 hours, preferably from about 2 hours to 4 hours. The reaction can be carried out by mixing the above reactants simultaneously or by adding one reactant to the remaining reactant, there being no critical order of addition of reactants. A catalyst can be utilized to facilitate ease of reaction but the reaction can be carried out without a catalyst. Typical catalysts which can be employed are anhydrous aluminum chloride, anhydrous aluminum bromide, boron trifluoride and zinc chloride.

When a catalyst is employed, it is usually present in an amount of from 0.50% to 5% per mole of ROH utilized in the above reaction. The reaction can be conducted in the absence of a solvent, or a chlorinated solvent or inert aliphatic solvent can be used as a reaction medium.

The dichloro intermediate is generally distilled prior to the reaction with reactants (b) and (c) in order to produce the pure compounds of this invention. The mole ratio of dichloro intermediate to reactants (b) and (c) is generally from about 1:1:1 to about 1:1.25:1.25, preferably from 1:1:1 to 1:1.15:1.15, respectively. The reaction is carried out by adding the dichloro intermediate to a mixture of reactants (b) and (c); however, the inverse order of addition can also be employed. Due to the exothermic nature of the reaction, it is preferred to add the dichloro intermediate gradually to the mixture of reactants (b) and (c) in order to maintain constant temperature.

When (b) and (c) are different, a two-step order of addition can be utilized. Thus, the dichloro intermediate can be added to (b) or (c) followed by the further addition of the remaining reactant (b) or (c) to the reaction system. The latter method selectively produces the pure compounds of this invention. When the dichloro intermediate is added directly to (b) and (c), wherein (b) and (c) are different, the pure compounds of this invention are isolated by selective distillation of the compounds. It is also contemplated within this invention that statistical mixtures can be obtained by direct addition of dichloro intermediate to a mixture of (b) and and (c), where (b) and (c) are different, that are represented by the general structures

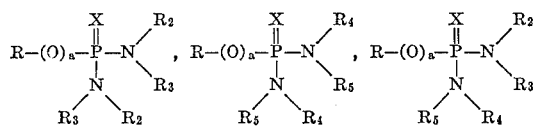

These mixtures of compounds can be selectively distilled to produce the pure compounds of this invention. However, the mixtures themselves can be utilized as fluids and are themselves contemplated within this invention.

To facilitate the ease of reaction, an acid acceptor can be employed, such as triethylamine and pyridine, or a basic medium can be employed to neutralize the by-product hydrogen chloride. Suitable basic mediums are aqueous sodium hydroxide. An aqueous solution containing from about 10% to 40% by weight base is generally employed to neutralize the hydrogen chloride evolved. Generally there should be present at least one mole of base per mole of hydrogen chloride liberated during the reaction to insure complete neutralization. However, conditions can be employed whereby no acid acceptor is utilized, and the volatile hydrogen chloride is taken directly overhead from the reaction. Thus, a partial vacuum can be applied directly to the reaction medium to facilitate the removal of the volatile hydrogen chloride.

The preferred method of reaction of the dichloro intermediate with the mixture of reactants (b) and (c) is by utilizing a basic medium consisting of aqueous sodium hydroxide wherein the aqueous sodium hydroxide is added directly to the mixture of reactants (b) and (c) whereby a uniform temperature of reaction is obtained.

The temperature of reaction is generally maintained from about 10° C. to about 80° C., preferably from about 20° C. to 40° C. The time for the reaction is generally from about 1 hour to about 8 hours, preferably from about 2 hours to about 4 hours.

The preferred compounds of this invention are those compounds in which X is oxygen and $a$ has a value of 1, herein defined as phosphorodiamidates, although the compounds where X is sulfur and $a$ is 0 are satisfactory for use as functional fluids. The unusual and unexpected properties of the phosphorodiamidates are their wide liquid range, viscosity characteristics at given temperatures and hydrolytic and thermal stability.

The triamides of an acid of phosphorus can be made by the reaction of phosphorusoxychloride or thiophosphorylchloride or the corresponding phosphorusoxy and thiophosphroyl halogens with an amine to produce the compounds of this invention. In general, it has been found that this reaction is limited due to the fact of incomplete reaction of all of the available chlorine atoms when the amines are hindered by long-chain alkyl groups. This type of reaction has been found to be applicable to less hindered amines, such as ethyleneimine and diethylamine. In order to produce pure triamides of an acid of phosphorus wherein X is oxygen, a two-step reaction is utilized. The first step consists of the reaction of one mole of phosphorustrichloride with at least 3 moles of an amine to produce a hexaalkyl phosphorus triamide. The reaction can be carried out in an inert solvent, such as diethyl ether and is generally conducted at a temperature of from about 0° C. to about 40° C. for a time sufficient to effect reaction. The phosphorus triamide can then be oxidized to the penavalent state using an oxidizing medium, such as dilute hydrogen peroxide. The difficulties encountered in the use of hydrogen peroxide are that yields are relatively low and oxidation can occur at sites other than the phosphorus atom. To obviate the difficulties encountered with the prior art oxidation systems and to provide extremely high yields and the production of pure compounds without adverse oxidative side reactions, it has now been found that phosphorustriamides can be oxidized to the pentavalent state, herein defined as phosphorotriamidates, by the interaction of ozone with the phosphorus triamide for a time sufficient to effect oxidation of the phosphorus atom to the tetravalent state. In general, ozone is introduced into the phosphorus triamide at a temperature of from about −50° C. to about +50° C. for a period of time of from about 0.5 hour to about 6 hours. A hydrocarbon solvent such as a short-chain aliphatic solvent, that is, hexane, heptane, etc., of a chlorinated hydrocarbon solvent such as methylene chloride can be used as a solvent during the above reaction. The hydrocarbon solvent and chlorinated hydrocarbon solvent can be used singly or together. The oxidation reaction is generally allowed to proceed for a length of time sufficient to effect complete oxidation. The extent of oxidation can be determined by continual analysis of the product such as by gas chromatography.

In general, it has been found that the triamides of an acid of phosphorus wherein X is oxygen have wide liquid ranges which are particularly applicable to use as heat transfer fluids and hydraulic fluids, although the triamides of an acid of phosphorus wherein X is sulfur are also satisfactory for use as functional fluids.

The aromatic hydroxy compounds which are useful in preparing the compounds of this invention are phenol, o-cresol, m-cresol, p-cresol and mixtures thereof, o-chlorophenol, m-chlorophenol, p-chlorophenol, o-bromophenol, m-bromophenol, p-bromophenol, 3,4-dichlorophenol, 3,4-dibromophenol, o-fluorophenol, m-fluorophenol, p-fluorophenol, 3,4 - difluorophenol, $\alpha,\alpha,\alpha$ - trifluoro-p-cresol, $\alpha,\alpha,\alpha$ - trifluoro - o - cresol, $\alpha,\alpha,\alpha$-trifluoro-m-cresol, m-N-methyl-n-butylaminophenol, 2,4-dimethylphenol, 3,4-dimethylphenol, 2,4 - dimethylphenol, 3,5-dimethylphenol, 2,4,6-trichlorophenol, 2,4,6-tribromophenol, 2,4,6-trifluorophenol, 2,4,6 - trichloro - m - cresol, 2,4,6-tribromo-m-cresol, 2,4,6 - trifluoro - m - cresol, 2-bromo-, 3-chloro, 4-bromophenol, 2 - bromo, 3 - fluoro, 4-bromo-, 5-methyl-phenol, 3-chloro-, 4-bromo-o-cresol, 2,3,4-phenoxyphenol, 2,3,4-thiophenoxyphenol and 2,3,4-hydroxy diphenyl.

The aliphatic hydroxy compounds which are useful in the preparation of the compounds of this invention are methanol, ethanol, n-propanol, isopropanol, n-butanol, n-amyl alcohol, n-hexyl alcohol, n-heptyl alcohol, n-octyl alcohol, isobutanol, isoamyl alcohol, sec.-butyl alcohol, tert.-butyl alcohol, tert.-amyl alcohol, isooctyl alcohol, isohexyl alcohol, isoheptyl alcohol, n-decyl alcohol, n-lauryl alcohol and alcohols prepared by the reaction of carbon monoxide and hydrogen with an olefin commonly referred to as oxo alcohols.

Typical examples of amines which can be used in the preparation of the compounds of this invention are dimethylamine, diethylamine, di-n-propylamine, di-n-butylamine, di-n-amylamine, di-n-hexylamine, N-methyl-n-ethylamine, N-methyl-n-propylamine, N-methyl-n-butylamine, N-methyl-n-amylamine, N-methyl-n-hexylamine, N-ethyl-n-propylamine, N-ethyl-n-butylamine, N-propyl-n - butylamine, N - butyl-n-amylamine, N-butyl-n-hexylamine, N-methyl-isobutylamine, N-methyl isoamylamine, diisopropylamine, diisobutylamine, N-isopropyl-n-butylamine, ethyleneimine, morpholine, piperidene, pyrrolidene, dihydropyrrole, 1,2-propyleneimine, 1,2-butyleneimine, 2,3 - butyleneimine, 2-methyl-1,2-propyleneimine, trimethyleneimine, hexamethyleneimine and the like.

When the above secondary amines are available in commercial quantities, there can be present to a limited extent primary amines. This invention also contemplates that the primary amines are also useful for the preparation of the compounds of this invention when blended with secondary amines.

The non-limiting examples which follow will permit a better appreciation of the preparation of the compounds of this invention.

EXAMPLE 1

To a 500 ml. four-neck reaction flask equipped with a heating mantle and stirrer was added 153.35 grams (one mole) of phosphorusoxychloride and 0.40 grams of aluminum chloride. The reaction mixture is heated to 95° C. and 94 grams (one mole) of liquid phenol is gradually added over a 3-hour period. After addition of the phenol the temperature is increased to 110° C. and held for a period of one hour. A 12 mm. vacuum was applied to the reaction system and the pure phenylphosphorodichloridate is distilled off at a temperature of 117° C. The refractive index ($n_D^{25}$) of the pure phenylphosphorodichloridate was 1.5208.

EXAMPLE 2

To a one-liter four-neck reaction flask was added 153.35 grams (one mole) of phosphorusoxychloride and 0.82 gram of aluminum chloride. The temperature was increased to 93° C. and 188 grams (two moles) of molten phenol was added over a 3½-hour period. The temperature was increased to 110° C. for a period of 1½ hours. The diphenylphosphorochloridate was distilled from the reaction flask at a temperature of 130° C.

EXAMPLE 3

To a 500 ml. four-neck reaction flask was added 153.35 grams (one mole) of phosphorusoxychloride and one gram of aluminum chloride. The temperature was increased to 100° C. and 128 grams (one mole) of m-chlorophenol was added over a 2-hour period. The reaction temperature was increased to 110° C. after addition of the m-chlorophenol and was maintained for an additional one hour. The m-chlorophenylphosphorodichloridate was distilled from the flask under a 0.8 mm. vacuum, B.P. 93–94° C.

Additional examples of the preparation of the phosphorodichloridates and the materials used for their preparation are given in Table I. In these additional examples, the phosphorusoxychloride and aluminum chloride catalyst were added to the reaction flask and the temperature increased, at which point the hydroxy compound was added. The temperature during the addition of the hydroxy compound (a) was from about 90° C. to about 100° C. and the time for addition of the hydroxy compound (a) was from about 2½ hours to about 3½ hours. After the addition of the hydroxy compound (a), heating was continued and the temperature maintained from about 100° C. to about 110° C. for an additional time of from about 1½ hours to about 2½ hours.

TABLE I.—PHOSPHORODICHLORIDATES

| Ex. No. | Hydroxy compound (a) | Grams (a) | Mole ratio phosphorus-oxychloride/(a) | Grams AlCl₃ | Compound |
|---|---|---|---|---|---|
| 4 | m-Bromophenol | 173 | 1/1 | 1.38 | m-Bromophenylphosphorodichloridate. |
| 5 | m-Fluorophenol | 112 | 1/1 | 0.90 | m-Fluorophenylphosphorodichloridate. |
| 6 | α,α,α-Trifluoro-m-cresol | 162 | 1/1 | 1.28 | α,α,α-Trifluoro-m-cresyl phosphorodichloridate. |
| 7 | N,N'-dimethyl-p-aminophenol | 135 | 1/1 | 2.40 | N,N'-dimethyl-p-aminophenyl phosphorodichloridate. |
| 8 | N-methyl-n-butyl-p-aminophenol | 178 | 1/1 | 2.90 | N-methyl-n-butyl-p-aminophenylphosphorodichloridate. |
| 9 | α,α,α-Trifluoro-p-cresol | 161 | 1/1 | 1.26 | α,α,α-Trifluoro-p-cresyl phosphorodichloridate. |
| 10 | p-Chlorophenol | 128 | 1/1 | 1.05 | p-Chlorophenylphosphorodichloridate. |
| 11 | p-Bromophenol | 172 | 1/1 | 1.35 | p-Bromophenylphosphorodichloridate. |
| 12 | p-Fluorophenol | 113 | 1/1 | 0.95 | p-Fluorophenylphosphorodichloridate. |

EXAMPLE 13

To a 500 ml. reaction flask equipped with stirrer, heating mantle and reflux condenser was added 153 grams (one mole) of phosphorusoxychloride and 3 grams of zinc chloride. The temperature was increased to 65° C. and a mixture of 94 grams of phenol (one mole) and 32 grams of methyl alcohol (one mole) (at a temperature of 45° C.) was added gradually over a 2-hour period.

The temperature was increased and some refluxing was observed. After 30 additional minutes, the temperature was 98° C. and this temperature was held for an additional 2 hours. The phenyl-, methylphosphorochloridate was selectively recovered by distilling from the reaction flask under a 20 mm. vacuum using a fraction cutter.

EXAMPLE 14

To a one-liter four-neck reaction flask was added 154 grams of phosphorusoxychloride (one mole) and 2.7 grams of aluminum chloride. The temperature was increased to 97° C. and a mixture containing 94 grams of phenol (one mole), 54 grams of p-cresol (0.50 mole) and 54 grams of m-cresol (0.50 mole) at 50° C. was added over a 3-hour period. The temperature after addition was increased to 108° C. and held for 2 hours. A mixture was obtained which by analysis contained a major amount of a mixture of phenyl-p-cresylphosphorochloridate and phenyl-m-cresylphosphorochloridate.

EXAMPLE 15

The general procedure of Example 14 was repeated substituting for the phenol and m- and p-cresol 108 grams of m-cresol (one mole) and 107.5 grams p-cresol (one mole) which was added to 154 grams of phosphorusoxychloride (one mole) and 3 grams of aluminum chloride. A mixture was obtained which on analysis contained di-p - cresylphosphorochloridate, di - m - cresylphosphorochloridate and m-cresyl-, p-cresylphosphorochloridate.

EXAMPLE 16

To a one-liter three-neck reaction flask equipped with stirrer, condenser, addition funnel and thermometer was charged 60 grams anhydrous dimethylamine (one mole) and pyridine at 5° C. The condenser was cooled with ice water. To the reaction vessel was added via the addition funnel 105.5 grams (0.50 mole) of cooled phenylphosphorodichloridate made as in Example 1. The pot temperature was kept below 10° C. (about 8° C.) during the addition which took 2½ hours. The reaction mixture was allowed to gradually warm with stirring to room temperature over a four-hour period and was then stirred at room temperature for 7 hours. The reaction product was washed with water which was drained off and then diluted with ether. The ether layer was washed with water until neutral and then dried with sodium chloride. The ether was stripped and the phenyl-N,N'-dimethylphosphorodiamidate was distilled using a Vigreaux column and vacuum. The phenyl-N,N'-dimethylphosphorodiamidate had a refractive index ($n_D^{25}$) of 1.5412.

EXAMPLE 17

To a mixture of 250 grams of triethylamine and 90 grams (one mole) of N-methyl-n-butylamine and 150 ml. of chloroform was added 105.5 grams (0.5 mole) of phenyl phosphorodichloridate. The latter was added dropwise over about an hour keeping the reaction temperature below 50° C. by external cooling. After the dichloridate addition was complete, the reaction mixture was stirred at room temperature for six hours. Work-up was effected by adding 400 ml. of water to dissolve amine hydrochlorides. The organic layer was washed with additional quantities of dilute hydrochloric acid to remove free amines. After a final water wash, solvents and water were removed under reduced pressure and the residual phenyl-N-methyl-N-n-butyl-N'-methyl-N' - n - butylphosphorodiamidate (140 grams, about 98% purity by g.l.c. analysis) was distilled under oil pump vacuum giving approximately 125 grams of colorless diamidate, B.P. 144–145° C./0.3 mm. and a refractive index ($n_D^{25}$) of 1.4914.

EXAMPLE 18

To a mixture of 100 grams (1.15 mole) of N-methyl-n-butylamine, 44 grams of sodium hydroxide and 150 ml. of water was added with good stirring 105.5 grams of phenyl phosphorodichloridate (0.50 mole) made as in Example 1. Addition was regulated so that with strong external cooling the reaction temperature could be kept below 40° C. After the addition of the dichloridate, which required about 30 minutes, the batch was stirred for one hour at 25–30° C. Approximately 100 ml. of hexane was then added to facilitate separation of the product from the water layer. The organic layer was washed twice with an equal volume of water and the solvent and volatile products were removed under water pump vacuum. The residual oil amounted to 135 grams of 98% pure phenyl-N-methyl-N-n-butyl-N'-methyl - N' - n - butylphosphorodiamidate.

EXAMPLE 19

To a 500 ml. reaction flask was added 45 grams 0.5 mole) of N-methyl-n-butylamine, 60 grams of triethylamine and 125 ml. of chloroform. The flask was purged with nitrogen and 134.3 grams (0.5 mole) of diphenylphosphorochloridate, made as in Example 2, was added dropwise over a 40-minute period. The temperature was maintained at 50° C. during addition. The reaction was continued for an additional 3½ hours at 50° C. The diphenyl-N-methyl-N-n-butylphosphoroamidate was washed with water after dilution with hexane and topped of solvents. The product had a refractive index ($n_D^{25}$) of 1.5270.

EXAMPLE 20

To a 12-liter reaction flask was added 1163 grams (21 moles) of N-methyl-n-butylamine, 1470 ml. of water and 550 grams of sodium hydroxide. To this mixture was added from an addition funnel, 1337.5 grams of a mixture containing 72.6% diphenylphosphorochloridate, 24.4% phenylphosphorodichloridate over a 45-minute period. The temperature during addition was 40° C. and the reaction was continued for an additional one hour at 40° C. The product was diluted with hexane and washed with water. The product was fractionated into two cuts, the first cut at 177 to 188° C. at 0.55 mm. vacuum and the second cut at 188 to 204° C. at 0.5–0.9 mm. vacuum. The results are as follows:

|  | Weight, grams |  |
|---|---|---|
| Cut 1 | 50 | 77% phenyl-N-methyl-N-n-butyl-N'-methyl-N'-n-butylphosphorodiamidate. <br> 23% diphenyl-N-methyl-N-n-butylphosphoroamidate. |
| Cut 2 | 1,083 | 61% diphenyl-N-methyl-N-n-butylphosphoroamidate. <br> 39% phenyl-N-methyl-N-n-butyl-N'-methyl-N'-n-butylphosphorodiamidate. |

Additional examples of the preparation of the phosphoroamidates of this invention and the materials used for their preparation are given in Table II. In the following examples, 1.1 mole of sodium hydroxide dissolved in 150 ml. of water was used as a base and added to reactant (b). The temperature during the addition of (a) to the mixture of (b) and aqueous sodium hydroxide was from about 25° C. to about 40° C. and the time for the addition of (a) was from about 25 minutes to about 35 minutes. The mole ratio of (a):(b) was from about 1:1 to about 1:1.25. After the addition of reactant (a) to (b), the reaction was continued for an additional one hour at 40° C.

Additional examples of the preparation of the phosphorodiamidates of this invention are given in Table III. In the following examples in Table III, 1.1 mole of sodium hydroxide in 150 ml. of water was added to the mixture of reactants (b) and (c). The temperature during addition of (a) to the mixture of (b), (c) and aqueous sodium hydroxide was from about 30° C. to about 45° C. and the time for addition of (a) was from about 30 minutes to about 45 minutes. The mole ratio of (a):(b):(c) was from about 0.50:0.50:0.48 to about 0.50:0.55:0.55. After addition of (a) to the mixture of (b) and (c), the reaction was continued for an additional 1½ hours at a temperature of 40° C.

phonyldichloride at a temperature of about 50° C. to 60° C. Some chloroform was added to keep the rate of stirring adequate. The reaction was continued for a period of about two hours at room temperature. The product was washed with dilute base followed by a water wash to remove any traces of base. The product was topped of solvents and the butyl-N-methyl-N-butyl-N'-methyl-N'-butylphosphonyldiamide was confirmed to NMR.

EXAMPLE 40

To a two-liter four-neck reaction flask equipped with stirrer was added 355 grams (3.2 moles) of di-n-propyl-

TABLE II.—PHOSPHOROAMIDATES

| | Reactants | | | |
|---|---|---|---|---|
| | Phosphorochloridate (a) $R-O-\overset{O}{\underset{Cl}{\overset{\|}{P}}}-O-R_1$ | | Amine $R_2-\overset{H}{\underset{\|}{N}}-R_3$ (b) | |
| Ex. No. | R | R₁ | | Compound |
| 21 | phenyl | methyl | dimethylamine | phenyl-, methyl-N,N-dimethylphosphoroamidate. |
| 22 | phenyl | methyl | di-n-butylamine | phenyl-, methyl-N,N-di-n-butylphosphoroamidate. |
| 23 | phenyl | m- and p-cresyl | dimethylamine | Mixture of: (a) phenyl-m-cresyl-N,N-dimethylphosphoroamidate. (b) phenyl-p-cresyl-N,N-dimethylphosphoroamidate. |
| 24 | m- and p-cresyl | m- and p-cresyl | ___do___ | Mixture of: (a) m-cresyl-p-cresyl-N,N-dimethylphosphoroamidate. (b) di-m-cresyl-N,N-dimethylphosphoroamidate. (c) di-p-cresyl-N,N-dimethylphosphoroamidate. |
| 25 | m-bromophenyl | m-bromophenyl | N-methyl-n-butyl | di-m-bromophenyl-N-methyl-N-n-butylphosphoroamidate. |
| 26 | m-chlorophenyl | m-chlorophenyl | N-methyl-n-butyl | di-m-chlorophenyl-N-methyl-N-n-butylphosphoroamidate. |
| 27 | α,α,α-trifluoro-m-cresyl | α,α,α-trifluoro-m-cresyl | N-methyl-n-butyl | di-α,α,α-trifluoro-m-cresyl-N-methyl-N-n-butylphosphoroamidate. |
| 28 | p-bromophenyl | p-bromophenyl | N-methyl-isoamyl | di-p-bromophenyl-N-methyl-N-n-isoamylphosphoroamidate. |
| 29 | p-chlorophenyl | p-chlorophenyl | N-methyl-isoamyl | di-p-chlorophenyl-N-methyl-N-n-isoamylphosphoroamidate. |
| 30 | m-bromophenyl | m-chlorophenyl | N-methyl-isoamyl | p-chlorophenyl-m-bromophenyl-N-methyl-N-n-isoamylphosphoroamidate. |

TABLE III.—PHOSPHORODIAMIDATES

| | Reactants | | | | | |
|---|---|---|---|---|---|---|
| | Phosphorodichloridate $R-O-\overset{O}{\underset{Cl}{\overset{\|}{P}}}-Cl$ (a) | Amines $R_2-\overset{H}{\underset{\|}{N}}-R_3$ (b) | | $R_4-\overset{H}{\underset{\|}{N}}-R_5$ (c) | | |
| Ex. No. | R | R₂ | R₃ | R₄ | R₅ | |
| 31 | phenyl | n-butyl | n-butyl | n-butyl | n-butyl | phenyl-N,N-di-n-butyl-N',N'-di-n-butylphosphorodiamidate. |
| 32 | phenyl | methyl | methyl | methyl | methyl | phenyl-N,N-dimethyl-N',N'-dimethylphosphorodiamidate. |
| 33 | m-chlorophenyl | methyl | n-butyl | methyl | n-butyl | m-chlorophenyl-N-methyl-N-n-butyl-N'-methyl-N'-n-butylphosphorodiamidate. |
| 34 | m-bromophenyl | methyl | n-butyl | methyl | n-butyl | m-bromophenyl-N-methyl-N-n-butyl-N'-methyl-N'-n-butylphosphorodiamidate. |
| 35 | α,α,α-trifluoro-m-cresyl | methyl | n-butyl | methyl | n-butyl | α,α,α-trifluoro-m-cresyl-N-methyl-N-n-butyl-N'-methyl-N'-n-butylphosphorodiamidate. |
| 36 | p-chlorophenyl | methyl | isobutyl | methyl | isoamyl | p-chlorophenyl-N-methyl-N-isobutyl-N'-methyl-N'-isoamylphosphorodiamidate. |
| 37 | p-bromophenyl | methyl | isobutyl | methyl | isoamyl | p-bromophenyl-N-methyl-N-isobutyl-N'-methyl-N'-isoamylphosphorodiamidate. |

EXAMPLE 38

To a two-liter reaction flask which had been purged with nitrogen was added 290 grams (3 moles) of N-butyl-N-methylamine and 202 grams (2 moles) of triethylamine. Phenylphosphonyldichloride, 195 grams (1 mole), was added slowly at a temperature of about 65° C. The stirring became difficult and chloroform was added to dilute the reactants. Four hundred ml. of chloroform was added during the addition of the dichloride. The reaction flask was stirred for two hours at 24° C. The product was washed with water and stripped of solvents. The phenyl-N-methyl-N-butyl-N'-methyl - N'-butylphosphonyldiamide was confirmed by NMR.

EXAMPLE 39

To a one-liter reaction flask which had been purged with nitrogen was added 87 grams (1 mole) of N-methyl-N-butylamine and 100 grams (1 mole) of triethylamine. To the reaction flask was then added dropwise butylphosamine and 500 ml. of diethyl ether. The reaction mixture was stirred at 5° C. while a solution of 55 grams (0.4 mole) of phosphorustrichloride and 150 ml. of ether was slowly added over a two-hour period at a temperature of about 5 to 10° C. After warming to room temperature, the mixture was stirred and refluxed for 4 hours and cooled to room temperature. The product was washed with dilute base and the N,N',N''-hexa-n-propylphosphorustriamide was recovered. 300 millimoles of the above phosphorustriamide and 50 ml. of ethylene chloride was charged to a stirred reactor and the mixture was cooled to a temperature of about −40° C. to −50° C. in a Dry Ice bath. An ozone oxygen stream delivering approximately 0.8 millimole ozone per minute was introduced into the stirred solution. Ozone was absorbed as rapidly as it was delivered to the reaction mixture. After 220 minutes the trivalent amide had been converted to the phosphoric oxidation level. The total consumption of ozone was determined to be 172 millimoles at this point. Ozone flow was terminated and the reaction mixture was allowed to warm to room temperature. The product was washed with dilute sodium hydroxide, dried and the solvent was removed under vacuum. The product was fractionally distilled and an 80% yield was obtained of N,N',N''-hexa-n-propylphosphorotriamidate.

EXAMPLE 41

To a 500 ml. reaction flask was added 45 grams of anhydrous dimethylamine (1 mole) and 50 ml. of triethylamine. The temperature was reduced to about 10° C. and 45 grams (0.206 mole) of N-di-n-propylphosphoroamidicdichloride, which was prepared by the reaction of dipropylamine with excess phosphorusoxychloride, was slowly added to the reaction flask. The mixtures were stirred at 10° C. for two hours and an additional two hours at 24° C. The reaction product was washed with dilute acid followed by extraction with dilute base and washed again with water. The crude product was topped under vacuum and fractionally distilled under a reduced pressure yielding (83% yield) N-di-n-propyl-N',N''-tetramethylphosphorotriamidate.

In a similar manner additional examples of the preparation of phosphorotriamidates were prepared as is shown in Table IV. In the following table the method of preparation is declined as follows: Direct preparation indicates that the phosphorotriamidate was prepared by the reaction of phosphorusoxychloride with at least three moles of amine; indirect preparation indicates that the phosphorotriamidate was prepared by first reacting phosphorustrichloride with at least three moles of amine followed by oxidation of the phosphorustriamide to the phosphoric oxidation state by means of ozone oxidation.

The thermal stability of the components and compositions of this invention were determined by the use of an isoteniscope according to the procedure of Blake et al., J. Chem. Eng. Data, 6, 87 (1961). Essentially this procedure is based upon the principle that when a fluid is heated in the isoteniscope apparatus, it exerts a vapor pressure which can be readily measured. The vapor pressure increases as temperature is increased following a straight-line relationship when logarithm of pressure is plotted versus the reciprocal of the absolute temperature. The vapor pressure curve will depart from a straight line if decomposition occurs to give volatile products. The tempearture at which this occurs is called the decomposition temperature ($T_D$).

Several tests were used for the measurement of the fire resistance of the instant fluids since there is no single test that can be used to evaluate all types of fluids under all expected use conditions. The degree of fire resistance in any given test is influenced by the characteristics of the fluid, the type of flame or source of ignition, the total amount of energy available in relatiton to the amount of fluid, the physical state of the fluid, and many other factors.

The early technical committees working on fire-resistant hydraulic fluid specifications for aircraft recognized the many factors involved in assessing fire resistance. As a result, the specifications developed by the SAE and the military required several different methods for testing the flammabilty of proposed products.

These specifications include the same general type of fire resistance tests. The test that was designed to simulate

TABLE IV.—PHOSPHOROTRIAMIDATES

| Ex. No. | Compound | Method of preparation |
|---|---|---|
| 42 | N-methyl-N-butyl-N'-methyl-N'-butyl-N''-methyl-N''-butylphosphorotriamidate | Indirect. |
| 43 | N-methyl-N-butyl-N',N''-tetramethylphosphorotriamidate | Direct. |
| 44 | N-di-n-propyl-N',N''-tetramethylphosphorotriamidate | Do. |
| 45 | N,N'-di-n-propyl-N''-dimethylphosphorotriamidate | Do. |

Typical properties of the above-prepared compounds are set forth in Table V. The tests or procedures used to measure the various properties of the fluids of this invention and the components thereof are as follows:

Viscosity—ASTM D–445–61
Hot manifold test—AMS 3150C
Autogenous ignition temperature—ASTM D–2155–63T In addition, the flash points and fire points of the compositions of this invention were also measured.

conditions in aircraft resulting from a broken line spraying hydraulic fluid into various sources of ignition is known as the "Hot Manifold Test." An additional test often used, which is a smaller scale test, is the Molten-metal Pour Test. In this test the fluid under evaluation is dropped from a medicine dropper or poured from a calibrated test tube onto the surface of molten aluminum alloy which has been heated to about 1250° F. If spontaneous ignition does not occur, a flame is place in the vapors to determine if they can be ignited.

TABLE V

| Product of Example No. | Physical properties | | | | | | Viscosity, cs. | | | Molten metal test, 1,250° F. | Hot manifold test |
|---|---|---|---|---|---|---|---|---|---|---|---|
| | Boiling point, ° mm./mg. | Pour point, ° F. | Flash point, ° F. | Fire point, ° F. | Theraml stability, $T_D$, ° F. | AIT, ° F. | −40° F. | 100° F. | 210° F. | | |
| 16 | | | 400 | 540 | | | | 13.43 | 3.15 | No spark / No burning spark / Intermittent burning | 1,100° F., no burning. / 1,200° F. burning. |
| 17 | | <−40 | 410 | 450 | 574 | 730 | 3,480 | 9.17 | 2.18 | No spark / No burning spark / Intermittent burning | 1,000° F., no burning. / 1,100° F., burning. |
| 19 | | | 435 | 540 | | | 204,300 | 15.94 | 2.79 | No spark / No burning spark / Intermittent burning | 1,100° F., no burning. / 1,200° F., burning. |
| 20: | | | | | | | | | | | |
| Cut 1 | | <−40 | 434 | 476 | | 740 | 6,417 | 10.49 | 2.32 | No spark / No burning spark / Intermittent burning | 1,100° F., no burning. / 1,200° F., burning. |
| Cut 2 | | | | | | | | 26,102 | 12.86 | 2.54 | No spark / No burning spark / Intermittent burning | 1,100° F., no burning. / 1,200° F., burning. |
| 23 | | | 420 | 529 | 597 | | | 12.14 | 2.97 | No spark / No burning spark / Intermittent burning | 1,100° F., no burning. / 1,200° F., burning. |
| 24 | | | 435 | 565 | 594 | | | 20.65 | 3.22 | No spark / No burning spark / Intermittent burning | 1,100° F., no burning. / 1,200° F., burning. |
| 40 | 140 at 0.35 | | | | | | 23,139 | 31.65 | 3.65 | | |
| 41 | 93 at 0.3 | | | | | | 399 | 4.19 | 1.36 | | |
| 42 | 138 at 0.25 | | 380 | 400 | | 510 | 1,283 | 8.13 | 2.03 | | |
| 43 | 90 at 0.15 | | | | | | 95.3 | 3.51 | 1.32 | | |
| 44 | 108 at 0.2 | | | | | | 834 | 5.52 | 1.60 | | |
| 45 | 138 at 0.15 | | | | | | 12,482 | 15.16 | 2.68 | | |

The compounds of this invention also possess good lubricating properties as evidenced by the results obtained from testing of the compounds on the Four-ball machine. Typical results are listed in Table VI.

TABLE VI

| | |
|---|---|
| Compound of Example No. | 17 |
| Temperature, °F. | 275 |
| Scar diameter, mm.: | |
| Steel on steel | 0.43 |
| Steel on bronze | 0.61 |

(Test conditions: 40 kg., 600 r.p.m. for 1 hour at the temperature indicated).

These results as tabulated in Tables V and VI show the outstanding physical properties of the compounds of this invention. The uniqueness of these compounds are well illustrated by their viscosity, fire resistance and anti-wear lubricating properties. These characteristics are obtainable with one compound, thereby obviating the need for a multi-component system.

In addition to the above, Table V significantly points out the excellent low temperature characteristics such as pour point and viscosity when $R_2$, $R_3$, $R_4$ and $R_5$ are different. The triamides of an acid of phosphorus have excellent low temperature characteristics and wide liquid range when at least one of the radicals represented by $R_2$, $R_3$, $R_4$, $R_5$, $R_6$ and $R_7$ are different. Thus, for the triamides of an acid of phosphorus, and particularly the phosphorotriamidates, there is an advantage with respect to having at least one substituent which is different with respect to the other substituents attached to the other nitrogen atoms. This low temperature characteristic provides a compound particularly suited for use as an aircraft hydraulic fluid and heat transfer fluid.

In addition to the above, the compounds of this invention are shear stable and are not prone to foaming and any foam formed is not stable. Furthermore, the claimed compounds have good stability, even at temperatures of 450° F. and in the presence of oxygen, and are essentially non-corrosive to metals, such as aluminum, aluminum bronze, iron, silver and titanium. A further advantage of the instant compounds is their outstanding hydrolytic stability.

As a result of the excellent physical properties of the compound of this invention and mixtures thereof, heat transfer systems can be developed wherein a liquid heat exchange medium is utilized to transfer heat to another body wherein said body is maintained at a predetermined temperature. In particular, the phosphorotriamidates have been found to be excellent heat exchange mediums due to their wide liquid range and in particular N-methyl-N-butyl-N',N" - tetramethylphosphorotriamidate is particularly effective as a liquid heat exchange medium.

As a result of the excellent physical properties of the compounds particularly described in the preceding examples, improved hydraulic pressure devices can be prepared in accordance with this invention which comprise in combination a fluid chamber and an actuating fluid in said chamber, said fluid comprising a compound hereinbefore described. In such a hydraulic apparatus wherein a movable member is actuated by the above-described functional fluids, performance characteristics are obtainable which are superior to those heretofore obtainable.

Because of the excellent fire-resistance of the compounds of this invention, their exceptionally low pour points, and good lubricating properties, the compounds of this invention can be utilized in those hydraulic systems wherein power must be transmitted and the frictional parts of the system lubricated by the hydraulic fluid utilized. Thus, the novel compounds of this invention find utility in the transmission of power in a hydraulic system having a pump therein supplying the power for the system. In such a system, the parts which are so lubricated include the frictional surfaces of the source of power, namely the pump, valves, operating pistons and cylinders, fluid motors, and in some cases, for machine tools, the ways, tables and slides. The hydraulic system may be of either the constant-volume or the variable-volume type of system.

The pumps may be of various types, including the piston-type pump, more particularly the variable-stroke piston pump, the variable-discharge or variable displacement piston pump, radial-piston pump, axial-piston pump, in which a pivoted cylinder block is adjusted at various angles with the piston assembly, for example, the Vickers Axial-Piston Pump, or in which the mechanism which drives the pistons is set at an angle adjustable with the cylinder block; gear-type pump, which may be spur, helical or herringbone gears, variations of internal gears, or a screw pump; or vane pumps. The valves may be stop valves, reversing valves, pilot valves, throttling valves, sequence valves or relief valves. Fluid motors are usually contant- or variable-discharge piston pumps caused to rotate by the pressure of the hydraulic fluid of the system with the power supplied by the pump power source. Such a hydraulic motor may be used in connection with a variable-discharge pump to form a variable-speed transmission.

The compounds of this invention when utilized as a functional fluid can also contain dyes, pour point depressants, anti-oxidants, defoamers and lubricity agents, such as diisopropyl hydrogen phosphite and the like.

In addition, the compounds of this invention when utilized as functional fluids can also contain viscosity index improvers, such as polyalkylmethacrylates and polyalkylacrylates. The viscosity index improver is generally present in a concentration sufficient to alter the viscosity characteristics of the fluid of this invention and is generally present in a concentration of from about 0.5% to about 25%. In the following table, the viscosity characteristics of functional fluids with a polyalkylmethacrylate, in which the alkyl group has from 4 to 12 carbon atoms and an average molecular weight of about 8000 to 12,000, are given. Compound (a) is N,N-dimethylmethylphenylphosphoroamidate and compound (b) is N-methyl-N-n-butyl-N'-methyl-N'-n-butylphenylphosphorodiamidate.

TABLE VII

| | VI improver concentration, percent | Viscosity, 100° F. | Percent viscosity increase | Viscosity, 210° F. | Percent viscosity increase |
|---|---|---|---|---|---|
| Compound: | | | | | |
| (a) | | 4.98 | | 1.53 | |
| (a) | 3 | 8.21 | 64.8 | 2.78 | 81.7 |
| (a) | 6 | 12.86 | 158.1 | 4.34 | 183.4 |
| (b) | | 9.17 | | 2.18 | |
| (b) | 3 | 21.15 | 130.5 | 4.86 | 122.7 |

It is evident from the above table that the compounds of this invention can be adapted to meet specific requirements as a viscosity due to their high degree of susceptibility to viscosity index improvers.

The embodiments of the invention in which an exclusive property or privilege is claimed are defined as follows:

1. A material selected from the group consisting of
   (a)(1) a monoamide of an acid of phosphorus represented by the structure

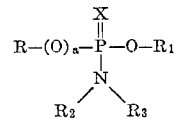

and
   (2) mixtures thereof;
   (b)(1) a diamide of an acid of phosphorus represented by the structure

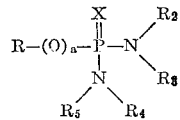

(c) mixtures of mono-, and diamides of an acid of phosphorus represented by (a) and (b), wherein R and $R_1$ are each selected from the group consisting of alkyl containing up to 12 carbon atoms, aryl containing up to 18 carbon atoms and substituted aryl containing up to 18 carbon atoms and having 1 to 4 substituents each of which is selected from the group consisting of halogen, lower alkyl, haloalkyl, phenoxy, thiophenoxy, phenyl and N,N-dialkylamino; $R_2$ and $R_4$ are each selected from the group consisting of linear alkyl groups containing from 1 to 12 carbon atoms, $R_3$ and $R_5$ respectively, are each selected from the group consisting of an alkyl group containing from 1 to 12 carbon atoms and which is different from $R_2$ and $R_4$ respectively, $a$ is a whole number having a value of 0 to 1 and X is a chalkogen selected from the group consisting of sulfur and oxygen.

2. A monoamide as in claim 1 wherein X is oxygen, $a$ is 1 and R is selected from the group consisting of aryl and substituted aryl.

3. A monoamide as in claim 2 wherein R and $R_1$ are phenyl.

4. A diamide as in claim 1 wherein $a$ is 1, X is oxygen and R is selected from the group consisting of aryl and substituted aryl.

5. A diamide as in claim 4 wherein R is phenyl.

6. A diamide as in claim 4 wherein R is halophenyl.

7. A diamide as in claim 5 wherein $R_2$ and $R_4$ are methyl and $R_3$ and $R_5$ are butyl.

8. A compound of claim 4 wherein R is m-chlorophenyl.

References Cited

UNITED STATES PATENTS

| | | | |
|---|---|---|---|
| 2,552,538 | 5/1951 | Drake et al. | 260—959 XR |
| 2,615,037 | 10/1952 | Moyle | 260—959 |
| 2,995,596 | 8/1961 | Debo | 260—939 XR |

CHARLES B. PARKER, Primary Examiner

A. H. SUTTO, Assistant Examiner

U.S. Cl. X.R.

252—77; 260—551, 955, 975, 984